(12) United States Patent
Savry et al.

(10) Patent No.: US 12,088,722 B2
(45) Date of Patent: Sep. 10, 2024

(54) METHOD FOR EXECUTING A COMPUTER PROGRAM BY MEANS OF AN ELECTRONIC APPARATUS

(71) Applicant: Commissariat à l'Energie Atomique et aux Energies Alternatives, Paris (FR)

(72) Inventors: Olivier Savry, Grenoble (FR); Thomas Hiscock, Grenoble (FR)

(73) Assignee: Commissariat à l'Energie Atomique et aux Energies Alternatives, Paris (FR)

(*) Notice: Subject to any disclaimer, the term of this patent is extended or adjusted under 35 U.S.C. 154(b) by 196 days.

(21) Appl. No.: 17/650,861

(22) Filed: Feb. 14, 2022

(65) Prior Publication Data

US 2022/0294634 A1 Sep. 15, 2022

(30) Foreign Application Priority Data

Mar. 9, 2021 (FR) ...................................... 21 02263

(51) Int. Cl.
*H04L 29/06* (2006.01)
*H04L 9/06* (2006.01)
*H04L 9/32* (2006.01)

(52) U.S. Cl.
CPC ............ *H04L 9/3234* (2013.01); *H04L 9/065* (2013.01)

(58) Field of Classification Search
CPC .............................. H04L 9/3234; H04L 9/065
USPC ......................................................... 713/190
See application file for complete search history.

(56) References Cited

U.S. PATENT DOCUMENTS

| 8,364,979 | B1* | 1/2013 | Ostrovsky | ........... G06F 21/6227 711/170 |
| 10,706,400 | B1* | 7/2020 | Puffer | .............. G06Q 20/38215 |
| 2005/0021986 | A1* | 1/2005 | Graunke | ................. G06F 21/85 713/193 |
| 2005/0149471 | A1* | 7/2005 | Lassalle | ................ G06F 16/322 |

(Continued)

FOREIGN PATENT DOCUMENTS

EP 3 761 199 A1 1/2021

OTHER PUBLICATIONS

McKeen, "Innovative Instructions and Software Model for Isolated Execution", 2013, HASP@ISCA, pp. 1-8 (Year: 2013).*

(Continued)

*Primary Examiner* — Taghi T Arani
*Assistant Examiner* — Gregory A Lane
(74) *Attorney, Agent, or Firm* — Oblon, McClelland, Maier & Neustadt, L.L.P.

(57) ABSTRACT

A method for executing a computer program includes incorporating, into metadata of a block containing a line of code to be accessed using a pointer, a first pointer identifier associated with the line of code to be accessed, then obtaining a pointer including a first range of bits containing the address of the line of code to be accessed, and a different second range of bits containing a second pointer identifier, then verifying that the second pointer identifier contained in the obtained pointer corresponds to the first pointer identifier associated with the line of code to be accessed and contained in the metadata of the loaded block, and when the first and second pointer identifiers do not correspond, then the security module triggers signaling of an execution fault.

11 Claims, 3 Drawing Sheets

(56) References Cited

U.S. PATENT DOCUMENTS

Figure 4:
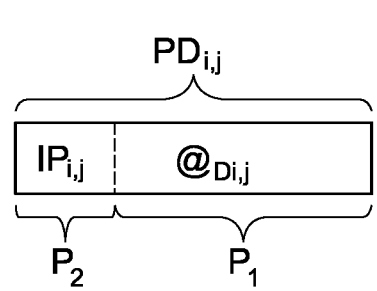

| | | | |
|---|---|---|---|
| 2006/0056625 A1* | 3/2006 | Nakabayashi | H04L 9/0894 380/46 |
| 2009/0254996 A1* | 10/2009 | Conus | H04N 21/26606 713/190 |
| 2010/0077225 A1* | 3/2010 | Salgado | H04L 9/3249 713/189 |
| 2014/0181520 A1* | 6/2014 | Wendling | H04L 63/0853 713/169 |
| 2015/0156176 A1* | 6/2015 | Collinge | H04L 63/0428 713/168 |
| 2016/0092702 A1* | 3/2016 | Durham | G06F 9/35 713/190 |
| 2017/0250796 A1* | 8/2017 | Samid | H04L 9/0838 |
| 2018/0164767 A1* | 6/2018 | Haase | G05B 19/05 |
| 2018/0220296 A1* | 8/2018 | Zeller | H04L 61/50 |
| 2019/0087566 A1 | 3/2019 | Hosie | |
| 2020/0186359 A1* | 6/2020 | Chan | H04L 9/3234 |
| 2020/0380141 A1* | 12/2020 | Wang | H04W 4/70 |
| 2021/0004456 A1 | 1/2021 | Savry | |
| 2021/0200684 A1* | 7/2021 | Gabor | G06F 12/0811 |

OTHER PUBLICATIONS

Liljestrand, "PAC it up: Towards Pointer Integrity using ARM Pointer Authentication", 2019, USENIX, pp. 1-18 (Year: 2019).*

French Preliminary Search Report issued Nov. 23, 2021 in French Application 21 02263 filed on Mar. 9, 2021, citing documents AA-AB, AO & AX therein, 11 pages (with English Translation of Categories of Cited Documents & Written Opinion).

Clercq et al., "SOFIA: Software and Control Flow Integrity Architecture", 2016 Design, Automation & Test in Europe Conference & Exhibition (Date), 2016, pp. 1172-1177.

* cited by examiner

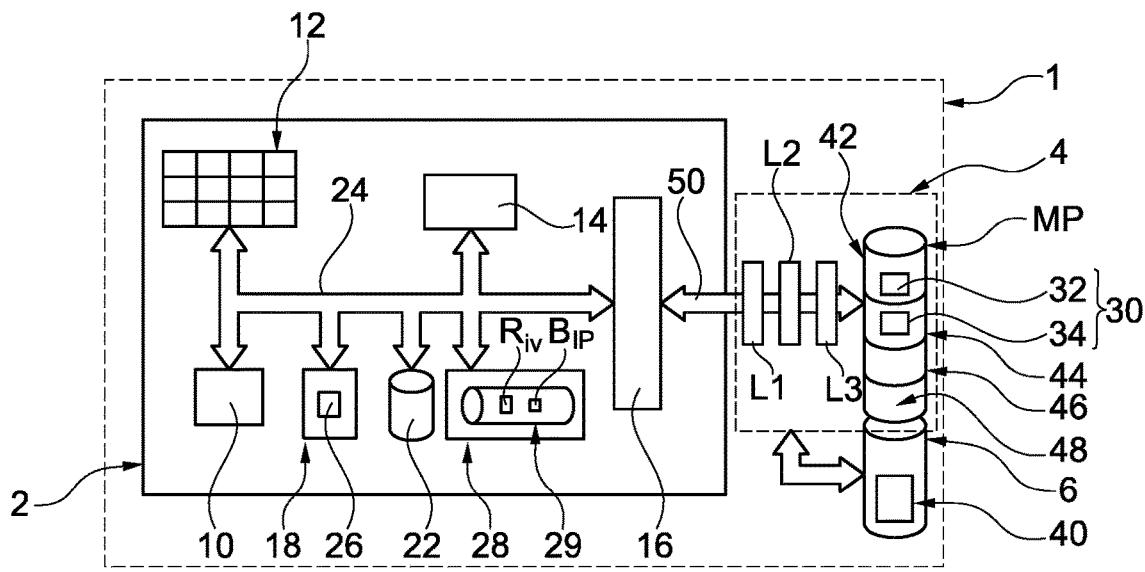
Fig. 1
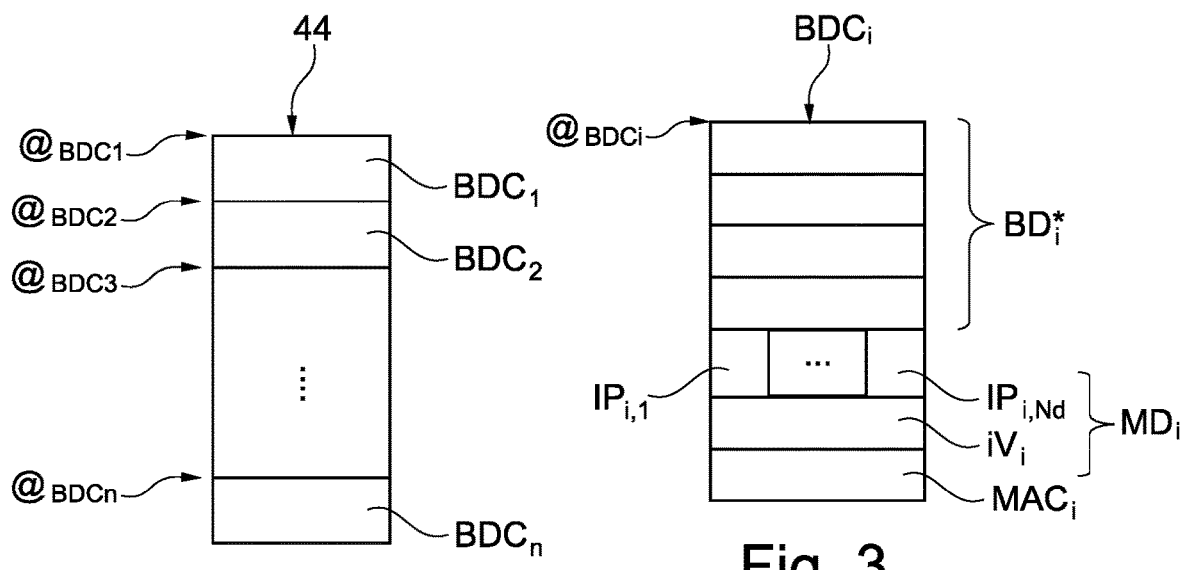
Fig. 2
Fig. 3

METHOD FOR EXECUTING A COMPUTER PROGRAM BY MEANS OF AN ELECTRONIC APPARATUS

The invention relates to a method for executing a computer program by means of an electronic apparatus comprising a microprocessor, an unencrypted memory, an encrypted memory and a hardware security module.

The invention also relates to:
- a computer program able to be executed by a microprocessor implementing this method, and
- a hardware security module for implementing this method.

For security reasons, it is known to store processed data, during the execution of a computer program, in encrypted form in a memory. Below, the memory or memory portion that contains these encrypted data is called the "encrypted memory". In this case, each time a datum must be loaded into the microprocessor in order to be processed thereby, the encrypted datum is first transferred from the encrypted memory to an unencrypted memory. Below, a memory in which the data are stored in unencrypted form is called an "unencrypted memory". During this transfer, the integrity of the datum to be loaded is first verified. Only if the integrity of the datum is confirmed, is the datum then decrypted then stored in the unencrypted memory.

In this context, data are also transferred, in the opposite direction, from the unencrypted memory to the encrypted memory to be stored therein. During this transfer, the datum is encrypted, then the authentication code allowing its integrity to be verified is computed. Lastly, the encrypted datum and its authentication code are stored in the encrypted memory.

The operations of verifying the integrity of a datum and of decrypting this datum take a relatively long time. Likewise, the operations of encrypting, and of computing an authentication code also take a relatively long time. Thus, to accelerate the transfers of data between the unencrypted memory and the encrypted memory, it has already been proposed to perform these transfers in blocks of a plurality of data, rather than transferring each datum individually. In this case, the block of data is stored in the encrypted memory in the form of a block of encrypted and authenticated data.

Such a block of encrypted and authenticated data notably comprises:
- a cryptogram of the block of cleartext data, and
- an authentication code of this cryptogram.

The cryptogram of the block of cleartext data is obtained by processing the block of data as a single block of bits and without distinguishing between the data. Thus, to obtain this cryptogram, a single encrypting operation is executed instead of one encrypting operation per datum of this block of data. This accelerates the operation of encrypting the data. However, the cryptogram can be decrypted only in a single decrypting operation. In particular, it is not possible to decrypt only one single portion of the data without decrypting the entirety of the cryptogram.

Similarly, the authentication code is common to all of the data of the block of data. It is therefore computed in a single operation in which the block of data is processed as a single block. Thus, the need to construct one authentication code for each datum of this block of data is avoided. This also accelerates the construction of the authentication code.

Moreover, numerous attacks are possible in order to obtain information about a computer program or cause unexpected operation of this computer program. Certain of these attacks are based on an erroneous use of a datum pointer. It will be recalled here that a datum pointer is a datum that contains the address of the datum to be processed and not directly the value of the processed datum.

Use of such data pointers is frequent in a computer program. For example, such a pointer is used to point to the first cell of a table of a plurality of cells. Subsequently, to process the following cell of this table, it is enough to simply increment the address contained in the pointer by a predetermined amount.

During design of the computer program, provision is made for the pointer to handle and process a group of data of a predetermined size. However, during execution of the computer program, it is sometimes possible to arrange for this pointer to point to a datum located outside of this group of data. For example, such an erroneous use of this pointer is caused by inputting, into an input field, a datum the size of which is much larger than the size initially provided for by the developers of the computer program. By virtue thereof, it is possible to write data to ranges of addresses where they should not be written. In other words, the pointer is used to point to invalid addresses. An example of this first type of attack is known by the term "stack overflow attack", when this attack targets the stack used by a function of the computer program. When the pointer is used to write data before the range of addresses provided to this end in the stack, the attack is known as a "stack underflow attack".

This first type of attack may be carried out in a fairly similar way to write data to invalid addresses in areas of the memory other than the stack, such as for example in an area known as the "heap".

These first types of attacks have in common that they use a valid pointer to point to invalid addresses. They are thus said to affect the field of spatial safety.

Erroneous uses of pointers that affect the field of temporal safety also exist. In this case, an invalid pointer is used to point to a valid address. An invalid pointer is a pointer that has been used in a valid way to process data in a limited context, and that is then reused outside of this limited context. This may occur if, for example, this pointer has not been correctly reinitialized or initialized. This type of invalid pointer is known as a "dangling pointer".

Certain attacks therefore locate these invalid pointers, then use them to write or read data at times at which they should not be used therefor. By way of illustration of this second type of attack, mention may be made of use-after-free attacks.

It will also be noted that attacks based on erroneous use of pointers do not concern only data pointers, i.e. pointers that point to a datum to be processed by the microprocessor. This type of attack also concerns the pointers that are referred to here as "function pointers", i.e. a pointer that contains the address not of a datum, but of an instruction to be executed by the microprocessor.

A number of ways have already been proposed to make erroneous use of a pointer more difficult. For example, one solution is described in patent application US2021/0004456. This solution is advantageous but is not applicable to a context in which the data are encrypted and decrypted in blocks. Specifically, as explained above, the advantages of encryption/decryption in blocks stem from the fact, in particular, that there is only a single authentication code common to all the data of each block. In contrast, the method described in patent application US2021/0004456 requires one authentication code to be used for each datum accessed with a pointer. The latter condition is therefore incompatible with encryption/decryption in blocks of data.

Prior art is also known from EP3761199A1 and US2019/087566A1, and from the article: Clercq Ruan De et al.: "SOFIA: Software and control flow integrity architecture", 2016 Design, Automation & Test In Europe Conference, 14 Mar. 2016, pages 1172-1177.

The invention therefore aims to provide a method for executing a computer program, said method being robust with respect to a broad spectrum of attacks based on erroneous use of a pointer, while being compatible with encryption/decryption in blocks of data.

One subject of the invention is therefore a method for executing a computer program by means of an electronic apparatus.

Another subject of the invention is a computer program able to be executed by a microprocessor by implementing the above method.

Another subject of the invention is a hardware security module for implementing the above execution method.

Figure 5:
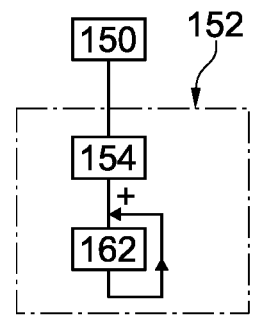
Figure 6:
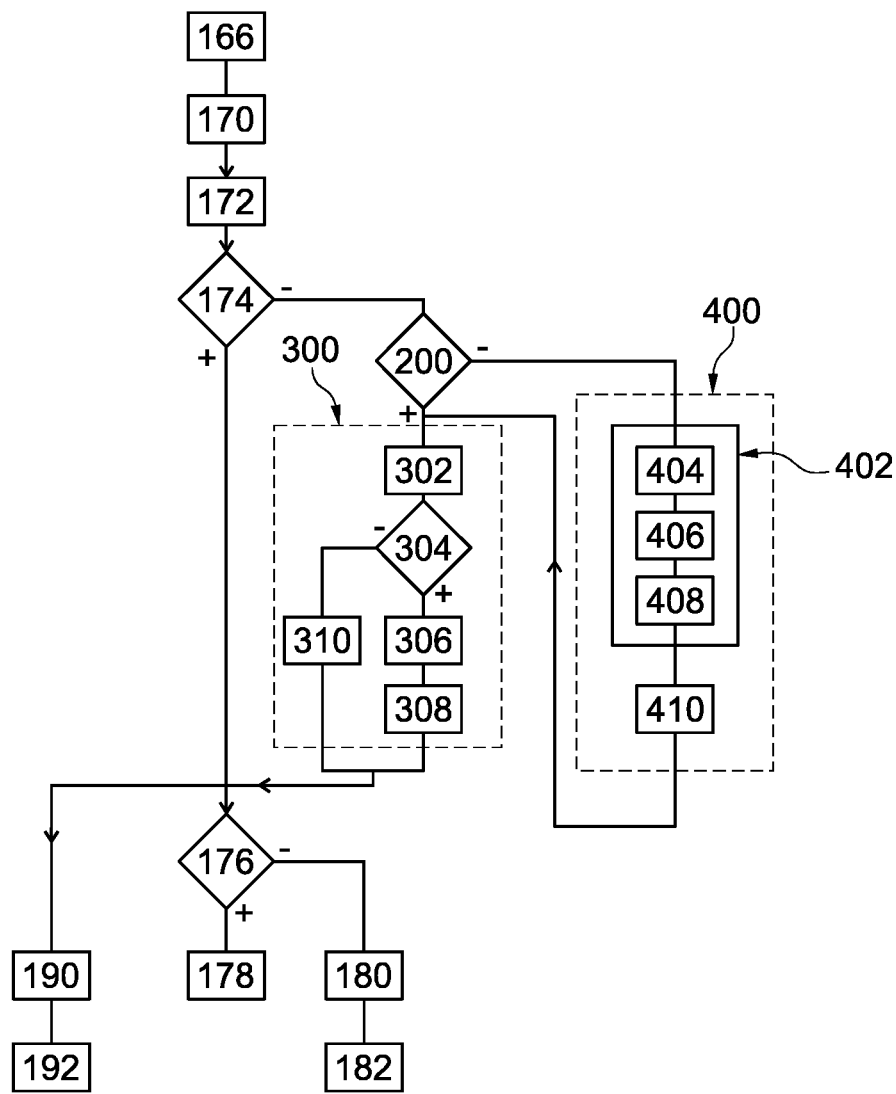
Figure 7:
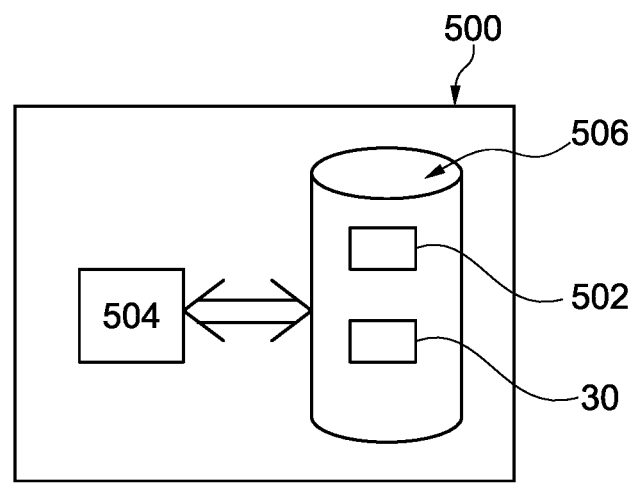

The invention will be better understood on reading the following description, which is given solely by way of non-limiting example, with reference to the drawings, in which:

FIG. 1 is a schematic illustration of the architecture of an electronic apparatus able to execute a binary code of a computer program, FIG. 2 is a schematic illustration of a portion of a main memory of the apparatus of FIG. 1, FIG. 3 is a schematic illustration of the structure of a block of encrypted and authenticated data contained in the portion of the memory of FIG. 2, FIG. 4 is a schematic illustration of the structure of an enriched pointer used in the execution of the binary code by the apparatus of FIG. 1;

FIG. 5 is a flowchart of a method for executing the binary code by means of the apparatus of FIG. 1, FIG. 6 is a flowchart of a method detailing the operations carried out when the executed instruction of the binary code is an instruction to load or to write a datum, FIG. 7 is a schematic illustration of a compiler able to generate the binary code executed by the apparatus of FIG. 1.

The conventions, notations and definitions used in this description are given in Section I. Next, a detailed exemplary embodiment is described in Section II with reference to the figures. In the subsequent section, Section III, variants of this detailed embodiment are presented. Lastly, the advantages of the various embodiments are presented in Section IV.

Section I: Conventions, Notations and Definitions

In the figures, the same references have been used to designate elements that are the same. In the rest of this description, features and functions that are well known in the art will not be described in detail.

In this description, the following definitions have been adopted.

A "program" designates a set of one or more preset functions that it is desired to have executed by a microprocessor.

A "source code" is a representation of the program in a programming language. The source code is not directly executable by a microprocessor. The source code is intended to be converted by a compiler into a binary code directly executable by the microprocessor.

A program or a code is said to be "able to be executed directly" or "directly executable" when it is able to be executed by a microprocessor without this microprocessor needing to compile it beforehand by way of a compiler or to interpret it beforehand by way of an interpreter.

An "instruction" denotes a machine instruction able to be executed by a microprocessor. Such an instruction consists:
of an opcode, or operation code, that codes the nature of the operation to be executed, and
of one or more operands defining the value(s) of the parameters of this operation.

The instruction set architecture of a microprocessor is formed by all of the opcodes usable to form instructions executable by the microprocessor. The instruction set architecture may be different from one microprocessor to another.

A "machine code" is a set of machine instructions. It typically is a file containing a sequence of bits with the value "0" or "1", these bits coding the instructions to be executed by the microprocessor. The machine code is able to be executed directly by the microprocessor, that is to say without the need for a preliminary compilation or interpretation.

A "binary code" is a file containing a sequence of bits bearing the value "0" or "1". These bits code data and instructions to be executed by the microprocessor. The binary code thus comprises at least one machine code and also, in general, digital data processed by this machine code.

To be executed by a microprocessor, the binary code is stored in lines in a main memory. Typically, the binary code comprises several hundred or thousand lines. Here, each of these lines is called a "line of code". Each line of code is stored at an address that is specific thereto in the main memory. Each line of code contains a single instruction or a single datum. Below, when the code contained in the line of code corresponds to an instruction, this line of code is simply called an "instruction". When the code contained in the line of code corresponds to a datum, the line of code is simply called a "datum". The term "line of code" is used both to designate a datum, and an instruction.

In the binary code, an instruction and a datum both correspond to bits. However, the instructions and the data are not processed in the same way by a microprocessor. For example, an instruction is solely loaded then executed by the microprocessor when the instruction pointer points to this instruction. A datum is loaded by the microprocessor only in response to the execution by this microprocessor of an instruction to load this datum.

The expression "execution of a function" is understood to designate execution of the instructions making up this function.

Section II: Detailed Exemplary Embodiment

FIG. 1 shows an electronic apparatus 1 comprising a microprocessor 2, a set 4 of memories and a mass storage medium 6. For example, the apparatus 1 is a computer, a smartphone, an electronic tablet or the like.

The microprocessor 2 here comprises:
an arithmetic logic unit 10;
a set 12 of registers;
a data buffer 14;
a data input/output interface 16 for inputting/outputting lines of code,
an instruction loader 18 having an instruction pointer 26,
a queue 22 of instructions to be executed, and
a hardware security module 28 comprising a secure non-volatile memory 29.

The set 4 is configured to store the lines of code of a binary code 30 of a program that must be executed by the microprocessor 2. The set 4 is a random-access memory. The set 4 is typically a volatile memory. Each line of code is associated with a physical address that is used to load it or to write it without modifying the other lines of code. Thus, below, these lines of code are said to be individually addressable. By way of illustration, in this embodiment, the lines of code are each coded on 64 bits and are therefore each formed by eight bytes. Below, the size of a line of code, in number of bytes, is denoted $T_d$.

Here, each line of code is also associated with a virtual address in the address space of the computer program. There is a bijective relationship that relates each virtual address of a line of code to the physical address of the same line of code. A virtual address is typically converted into a physical address by a memory management unit (MMU).

For example, the set 4 comprises:
three cache-memory levels, and
a main memory MP.

The cache memories allow the transfer of data between the main memory MP and the microprocessor 2 to be accelerated. The three cache-memory levels are conventionally called L1, L2 and L3. In FIG. 1, the symbols "L1", "L2" and "L3" have been used to designate the three cache memories L1, L2 and L3, respectively. Here, to simplify FIG. 1, the cache memory L1 is shown outside the microprocessor 2 whereas, often, it is integrated into the microprocessor 2. The memories L1 to L3 are classed in order of the speed at which data can be read, the memory L1 being the fastest. Generally, the size of cache memories is inversely proportional to their speed.

Conventionally, after the binary code 30 has been loaded into the memory MP, the memory MP notably comprises the following portions:
a first portion 42 containing the instructions to be executed,
a second portion 44 containing the data to be processed,
a third portion 46 used to save the execution context of a function when it calls another function, and
a fourth portion 48 used to dynamically allocate memory to the program during execution with a view to storing data therein.

The portion 42 is known as the "code segment" or "text segment".

The portion 44 typically contains the static and global variables of the executed program. The portion 44 is itself conventionally divided into first and second sections. The first section contains static and global variables that were initialized during compilation. This first section is known as the data segment and often denoted ".data". The second section comprises static and global variables that were not initialized during the compilation of the binary code 30. This second section is also known as the "bss segment" and often denoted ".bss". Generally, these two sections are contiguous.

The portion 46 is known as the "call stack". Therefore, below, the portion 46 is also called the "stack 46". Lastly, the portion 48 is known as the "heap". Therefore, below, the portion 48 is also called the "heap 48".

The binary code 30 notably comprises a machine code 32 and a block 34 of data necessary to the execution of the binary code 30. The machine code 32 and the block 34 are stored in the portions 42 and 44, respectively.

The execution of the binary code 30 thus starts with loading and processing of the data of the block 34. Here, in particular, the block 34 comprises a cryptogram ka* obtained by encrypting a secret key ka using a public key $pk_{CPU}$ of the microprocessor 2.

The memory set 4 is connected to the microprocessor 2 by a databus and an address bus. To simplify FIG. 1, these two buses have been represented by a double-headed arrow 50 and are collectively designated in the rest of this description by the term "bus 50".

The size of the address bus determines the size $N_@$, in number of bits, of the addresses used to access the memory 4. Typically, the size $N_@$ is larger than or equal to 8, 16, 32 or 64 bits. For example, in this embodiment, the size $N_@$ is equal to 64 bits.

The set 4 is a set of encrypted memories, i.e. a set in which the lines of code are stored in encrypted form. Below, the description is given in the particular case where the encrypted lines of code are data contained in the portion 44.

A division into blocks of encrypted and authenticated data of the portion 44 is shown in FIG. 2. In this Figure and in the rest of the description, a block of encrypted and authenticated data stored in the memory MP at the address $@_{BDCi}$ is denoted "$BDC_i$", where the index i is an identifier of this block $BDC_i$. Here, the index i is the order number of the block of data, counted from the first block $BDC_1$, i.e. the block located at the start of the portion 44. The address $@_{BDCi}$ is here equal to the address at which the block $BDC_i$ starts. In this example, the index i varies from 1 to n so that the portion 44 is divided in n distinct blocks $BDC_i$. In FIGS. 2 to 6, the symbol " . . . " indicates that some of the elements have not been shown.

Here, all the blocks $BDC_i$ are structurally identical. Thus, only the block $BDC_i$ shown in FIG. 3 will be described in detail. The size of the block $BDC_i$ in number of bytes is denoted $T_b$ below. The size $T_b$ is larger than eight or sixteen and, generally, higher than or equal to 32 or 64 bytes. Generally, the size $T_b$ is smaller than 1 kB or 1 MB. In this first embodiment, by way of illustration, the size $T_b$ is equal to 128 bytes The block $BDC_i$ comprises, in order starting from the address $@_{BDCi}$ of the start thereof:
a cryptogram $BD_i^*$,
metadata $MD_i$, and
an authentication code $MAC_i$.

The cryptogram $BD_i^*$ is obtained by encrypting a block $BD_i$ of $N_d$ cleartext data $D_{i,j}$ using the cryptographic key ka, where $N_d$ is an integer number higher than one or two or four. Here, the number $N_d$ is equal to eight. The index j is an identifier of the datum $D_{i,j}$ that allows it to be distinguished from the other data contained in the same block $BD_i$. Here, the index j is the order number of the datum $D_{i,j}$ counted from the first datum $D_{i,1}$ of the block $BD_i$, i.e. from the datum $D_{i,1}$ located at the address $@_{BDi}$ at which the block $BD_i$ starts.

More precisely, the cryptogram $BD_i^*$ is obtained using the following relationship: $BD_i^* = f_{ka}(BD_i; iv_i)$, where:
$f_{ka}$ is an encryption function, corresponding to a decrypting function $f_{ka}^{-1}$, and
$iv_i$ is an initialization vector, also known as a "nonce".

The functions $f_{ka}$ and $f_{ka}^{-1}$ are pre-programmed in the module 28. The function $f_{ka}$ is typically a symmetric encryption function. For example, the function $f_{ka}$ is a stream cipher, initialized with the vector $iv_i$.

The vector $iv_i$ is an initialization vector the value of which is modified each time the function $f_{ka}$ is used to encrypt a block $BD_i$ of cleartext data. In contrast, the key ka remains the same. Therefore, the key ka allowing the cryptogram $BD_i^*$ to be decrypted is stored beforehand in the memory 29 in order to allow the module 28 to decrypt each cryptogram $BD_i^*$.

In this embodiment, each block $BD_i$ contains $N_d$ data $D_{i,j}$ associated with respective and consecutive virtual addresses. Below, the virtual address of a datum $D_{i,j}$ is denoted $@_{Di,j}$. Each block $BD_i$ therefore corresponds to a continuous range of $N_d$ consecutive virtual addresses. These ranges of virtual addresses are distinct from one another. In particular, they do not overlap so that a given datum $D_{i,j}$ cannot be contained in a plurality of different blocks $BD_i$. In addition, these ranges of addresses are contiguous with one another so that there are, between a first and a second contiguous block $BD_i$, $BD_{i+1}$, no data that belong neither to the block $BD_i$ nor to the block $BD_{i+1}$. Thus, the blocks $BD_i$ form, in the address space of the computer program, a succession of consecutive data blocks. Inside a given block $BD_i$, the $N_d$ data $D_{i,j}$ are, for example, classified in order of increasing address so that the datum $D_{i,1}$ is the first datum of the block $BD_i$. Under these conditions, the address $@_{BDi}$ of the start of the block $BD_i$ is equal to the address $@_{Di,1}$ of the datum $D_{i,1}$.

The size $T_{BD}$ of the block $BD_i$ is equal to $N_d T_d$, where $T_d$ is the size of a datum $D_{i,j}$ in number of bytes. Here, the size of the cryptogram $BD_i^*$ is equal to the size of the block $BD_i$.

The metadata $MD_i$ here contain:
  for each datum $D_{i,j}$, a location reserved for the storage of the bits of a pointer identifier $IP_{i,j}$ specifically associated with this datum $D_{i,j}$, and
  the vector $iv_i$ used to obtain the cryptogram $BD_i^*$.

In the metadata $MD_i$, there are as many locations reserved for the storage of a pointer identifier as there are data $D_{i,j}$ in the block $BD_i$. In FIG. 3, each of these locations has been designated by the reference "$IP_{i,j}$" of the identifier $IP_{i,j}$ that it is intended to contain. Here, the size of each identifier $IP_{i,j}$, and therefore the size of each reserved location, is equal to 8 bits.

The identifier $IP_{i,j}$ is an identifier that allows one pointer $PD_{i,j}$ among a set of other pointers used in the same execution of the binary code 30 to be uniquely identified. The pointer $PD_{i,j}$ is a pointer that contains the address of the datum $D_{i,j}$ and that allows this datum to be accessed.

The identifier $IP_{i,j}$ is constructed so as to limit the probability of two different pointers having the same pointer identifier. For example, the pointer identifiers are constructed so that this probability is lower than one in ten and, preferably, one in fifty or one in a hundred or one in a thousand.

The identifier $IP_{i,j}$ may be generated either during the compilation of the source code to obtain the binary code 30 or dynamically during the execution of the binary code 30.

For example, when the pointer $PD_{i,j}$ is declared in the source code, the identifier $IP_{i,j}$ is generated during compilation. In this case, conventionally, such a pointer points to a global variable or to a static variable or to a local variable. During compilation of the source code, to minimize the probability of two different pointers having the same pointer identifier, for example, the compiler generates the identifier $IP_{i,j}$ of the pointer by randomly or pseudo-randomly drawing this identifier from a set EIP. The set EIP contains all the possible pointer-identifier values with the exception of values already attributed to a pointer identifier. In another embodiment, each time the identifier $IP_{i,j}$ is randomly or pseudo-randomly drawn from the set EIP. By way of illustration, to do this, in the case of a compiler using LLVM (acronym of low-level virtual machine), the instruction "Alloca" is modified to generate at the same time the pointer $PD_{i,j}$ and the identifier $IP_{i,j}$ of this pointer. The instruction "Alloca" generates a pointer that typically points to a local variable stored in the stack 46.

When the binary code contains instructions that, when they are executed by the microprocessor 2, dynamically allocate a free memory region to the storage of data, then the pointer $PD_{i,j}$ and its identifier $IP_{i,j}$ are generated during the execution of the binary code 30. More precisely, when such instructions are executed, they generate a pointer that points to the dynamically allocated memory region. Such instructions are frequently used to allocate a memory region in the heap 48. For example, in a source code using the standard libraries of the language C, such instructions correspond to the functions "malloc( )", "calloc( )", "realloc( )", etc., etc. In this case, these functions "malloc( )", "calloc( )", "realloc( )", etc., etc. are modified to generate the identifier $IP_{i,j}$ at the same time as the pointer $PD_{i,j}$ is generated. Preferably, each execution of such a function must generate an identifier $IP_{i,j}$ that is as different as possible from the identifier $IP_{i,j}$ generated in the preceding execution of the same function. To do this, for example, on each execution of such a function:
  the identifier $IP_{i,j}$ is drawn, randomly or pseudo-randomly, from the set EIP, or
  the identifier $IP_{i,j}$ is set equal to the digital fingerprint obtained by applying a hash function to the address $@_{Di,j}$ of the datum $D_{i,j}$ to which the pointer $PD_{i,j}$ points.

The role of this identifier $IP_{i,j}$ is detailed below with reference to FIG. 6.

The code $MAC_i$ is an integrity tag that allows the integrity of the block $BD_i$ of data to be verified. To this end, the code $MAC_i$ is a code allowing the integrity and authenticity of the cryptogram $BD_i^*$ to be verified. In addition, in this embodiment, the code $MAC_i$ also allows the integrity and authenticity of the metadata $MD_i$ to be verified. This code $MAC_i$ is what is commonly called a "message authentication code" (MAC). Such a code $MAC_i$ is obtained by constructing a digital fingerprint using the cryptogram $BD_i^*$ and the metadata $MD_i$. This digital fingerprint normally comprises fewer bits than the cryptogram $BD_i^*$. Such a digital fingerprint is better known as a "digest" or "hash". This digital fingerprint is constructed using a preset function and a secret key k' known only to the author of the binary code 30 and to the microprocessor 2. Here, the key k' is stored beforehand in the memory 29 of the security module 28. For example, the preset function is a one-way function such as a hash function. In this case, generally, the digital fingerprint is the result of applying this hash function to a combination, for example a concatenation, of the cryptogram $BD_i^*$ and of the metadata $MD_i$. The code $MAC_i$ is typically larger than or equal to 32 bits or 64 bits in size. Here, the code $MAC_i$ is sixteen bytes in size.

In this embodiment, to accelerate the transfers of data between the microprocessor 2 and the set 4 of memories, the sizes $T_b$ and $T_{BD}$ are both powers of two. To achieve this, the size $T_b$ is equal to two times the size $T_{BD}$. Thus, in this example, $T_{BD}$ is equal to 64 bytes. Under these conditions, the metadata $MD_i$ are forty-eight bytes in size. Among these forty-eight bytes, eight thereof are used to store the identifiers $IP_{i,j}$ and eight bytes are used to store the vector $iv_i$.

Lastly, the address $@_{BDCi}$ at which the block $BDC_i$ starts is defined by the following relationship, relationship (1): $@_{BDCi} = @_{BDi} \cdot T_b / T_{BD}$. The ratio $@_{BDi}/T_{BD}$ is here necessarily an integer number since the address $@_{BDi}$ is equal to the sum of the sizes of the blocks $BD_1$ to $BD_{i-1}$. In addition, preferably, the relationship that converts each address $@_{BDCi}$ into a physical address in the memory MP is a linear relationship. Thus, the blocks $BDC_i$ are classified in the memory MP in the same order as the blocks $BD_i$, i.e. in order of increasing physical addresses of the data $D_{i,j}$ that are encrypted in this block $BDC_i$. In addition, relationship (1) requires the blocks $BDC_i$ to be, in the memory MP, immediately consecutive to one another and to not overlap.

In this example, the instruction set architecture of the microprocessor 2 notably comprises a write instruction and a load instruction.

A write instruction is an instruction that, when it is executed by the unit 10, causes a datum to be written to the set 4.

A load instruction is an instruction that, when it is executed by the unit 10, causes a datum to be loaded into the microprocessor 2 from the set 4. Generally, the loaded datum is stored in a register of the microprocessor such as, for example, one of the registers of the set 12.

By way of illustration, the microprocessor 2 is a reduced-instruction-set computer (RISC) and implements the "RISC-V" instruction set.

The unit 10 here is an $N_{inst}$-bit arithmetic logic unit. $N_{inst}$ is typically an integer higher than or equal to 8, 16, 32 or 64. In this example, $N_{inst}$ is equal to 32.

The loader 18 loads the next instruction to be executed by the unit 10 into the queue 22 from the set 4 of memories. More precisely, the loader 18 loads the instruction to which the instruction pointer 26 points.

The unit 10 is notably configured to execute one after another the instructions loaded into the queue 22. The instructions loaded into the queue 22 are generally automatically executed in the order in which these instructions were stored in this queue 22. The unit 10 is also capable of storing the result of these executed instructions in one or more of the registers of the set 12.

In this description, "execution by the microprocessor 2" and "execution by the unit 10" will be used synonymously.

The buffer 14 is used to further accelerate the transfers of data between the microprocessor 2 and the memory set 4. To do this, the data transferred between the microprocessor 2 and the set 4 are systematically transferred in entire blocks containing exactly $N_d$ data. More precisely, when a datum is loaded from the set 4, it is the block $BDC_i$ that contains this datum that is transferred, in its entirety, to the microprocessor 2 via the bus 50. Similarly, when a datum must be written to the set 4 of memories, it is a complete block $BDC_i$, containing this written datum, that is transferred from the microprocessor 2 to the set 4 via the bus 50.

Here, the buffer 14 is an unencrypted memory, i.e. a memory in which the data are stored in clear form (i.e. in cleartext). This buffer 14 is able to contain at least one block $BD_i$ of cleartext data. In this embodiment, by way of illustration, it is able to contain a single block $BD_i$ of data.

The module 28 is capable of automatically executing the various operations described in detail with reference to the method of FIG. 6, in order to make the execution of the computer program secure. In particular, it is able to convert a block $BDC_i$ into a block $BD_i$ of cleartext data and vice versa. The module 28 operates independently and without using the unit 10. It is thus capable of processing blocks of data before and/or after they have been processed by the unit 10. To this end, it notably comprises the secure non-volatile memory 29. This memory 29 can only be accessed via the module 28. In particular, the unit 10 cannot address this memory 29.

In this embodiment, the module 28 is pre-programmed, for example during its manufacture, to execute operations such as the following operations:

verify the integrity and authenticity of a block $BDC_i$ using the code $MAC_i$ that it contains,
compute a code $MAC_i$,
encrypt the block $BD_i$ to obtain the cryptogram $BD_i^*$,
decrypt the cryptogram $BD_i^*$ to obtain the block $BD_i$ of cleartext data.

The memory 29 is used to store the secret information required to implement the method of FIG. 6. Here, it therefore notably comprises secret information that was stored before the start of the execution of the binary code 30. In particular, it comprises the following information stored beforehand:

a secret key k' used for the computation and verification of the codes $MAC_i$,
a secret private key $sk_{CPU}$ that allows the data encrypted using the public key $pk_{CPU}$ to be decrypted.

In this embodiment, the memory 29 also comprises:

a register $R_{iv}$, for storing an initialization vector $iv_i$, and
a register $B_{IP}$ for storing the pointer identifiers.

In this exemplary embodiment, the set 12 comprises general registers that are usable to store any type of data.

A bus 24 for exchanging data links the various components of the microprocessor 2 to one another. It has been shown in FIG. 1 in order to indicate that the various components of the microprocessor 2 are able to exchange data with one another.

The medium 6 is typically a non-volatile memory. It is for example an EEPROM or Flash memory. Here, it contains a backup copy 40 of the binary code 30. It is typically this copy 40 that is automatically copied to the memory 4 to restore the code 30, for example after a loss of current or the like or just before the execution of the code 30 starts.

FIG. 4 shows the structure of the pointer $PD_{i,j}$. Here, the size of the pointer $PD_{i,j}$ is equal to the size $N_@$ of the memory addresses. The pointer $PD_{i,j}$ comprises:

a range $P_1$ of bits containing the address $@_{Di,j}$ to which the pointer $PD_{i,j}$ points, and
a separate range $P_2$ of bits containing the identifier $IP_{i,j}$ of the pointer $PD_{i,j}$.

The data $D_{i,j}$ are contained in a range of addresses of the address space of the program, the size of which is strictly smaller than $2^{N_@}$, in order to leave enough space to code the identifier $IP_{i,j}$ inside the pointer $PD_{i,j}$. To this end, the size of the range $P_{i,j}$, is smaller than $N_@-N_P$ bits, where $N_P$ is the size, in number of bits, of the identifier $IP_{i,j}$. Preferably, the size $N_P$ is larger than 4 bits or 8 bits or 16 bits and, generally, smaller than 32 bits or 54 bits. Here, the size $N_P$ is equal to 8 bits and the addresses $@_{Di,j}$ are therefore coded on fewer than 56 bits. In this embodiment, the range $P_1$ corresponds to the $N_@-N_P$ least significant bits of the pointer $PD_{i,j}$ and the range $P_2$ corresponds to the $N_P$ most significant bits of the pointer $PD_{i,j}$. To obtain the address $@_{Di,j}$ of the datum $D_{i,j}$ from the pointer $PD_{i,j}$, it is enough therefore to mask the most significant bits of the pointer $PD_{i,j}$, these bits being used to store the identifier $IP_{i,j}$.

Such a pointer $PD_{i,j}$ containing, in addition to the address $@_{Di,j}$, other information, i.e. here the identifier is referred to as an "enriched pointer".

FIG. 5 shows a method for executing the binary code 30 by means of the microprocessor 2.

The method starts with a step 150 of generating and then delivering the binary code 30 to the memory MP. The binary code 30 is typically generated by a compiler, such as the one described below with reference to FIG. 7.

During compilation of the source code, each time the compiler constructs a block $BDC_i$, for each datum $D_{i,j}$ that is loaded using a pointer $D_{i,j}$, it records the identifier $IP_{i,j}$ of this pointer in the metadata $MD_i$. As regards data $D_{i,j}$ that are not accessed using a pointer, the bits located, in the metadata $MD_i$, in the location reserved for storage of the pointer identifier associated with this datum are initialized to zero. In other words, the pointer identifier associated with a datum not accessed using a pointer is set to zero.

The delivery of the binary code 30 then consists in storing the copy 40 on the medium 6. Next, for example, the microprocessor 2 copies the copy 40 to the memory MP in order to obtain a copy of the binary code 30 stored in the memory MP. Thus, in step 150, the blocks $BDC_i$ constructed during the compilation of the source code and contained in the binary code 30 are stored in the memory MP and, generally, in the portion 44.

Next, in a phase 152, the microprocessor 2 executes the binary code 30 and, in particular, the machine code 32.

At the start of the phase 152, in a step 154, the module 28 notably loads the cryptogram ka* contained in the block 34 and decrypts it using the key $sk_{CPU}$ contained in the memory 29. At the end of step 154, the key ka is contained in the memory 29.

Next, in step 162, the microprocessor 2 executes, one after another, the instructions of the machine code 32. In this step 162, instructions to load a datum using a pointer and instructions to write a datum using a pointer are executed. Below, these two types of instructions are collectively designated by the expression "access instruction" or "instruction to access the memory". Each time an instruction to access the memory is executed by the microprocessor 2, the method of FIG. 6 is executed.

The method for increasing the security of data stored in the set 4 will now be described with reference to FIG. 6 and in the case where the accessed datum is a datum $D_{i,j}$ accessed using the pointer $PD_{i,j}$.

Firstly, in a step 166, the pointer $PD_{i,j}$ is obtained. Typically, the instruction to access the datum $D_{i,j}$, which is executed by the unit 10, comprises an operand that contains the address at which the pointer $PD_{i,j}$ is stored. Thus, execution of this access instruction by the unit 10 firstly triggers the pointer $PD_{i,j}$ to be loaded into a register of the microprocessor 2.

Next, in a step 170, the pointer $PD_{i,j}$ is transmitted to the module 28.

In a step 172, the module 28 determines the address $@_{BDCi}$ of the block $BDC_i$ that contains this datum $D_{i,j}$. To do this, the module 28 here computes the address $@_{BDCi}$ using the following relationship, relationship (2): $@_{BDCi}=E(@_{Di,j}/T_{BD})\cdot T_b$, where: $-E(\ldots)$ is the function that returns the integer part of the number between parentheses, and $T_{BD}$ and $T_b$ are the sizes, in number of bytes, of the block $BD_i$ and of the block $BDC_i$, respectively.

The function $E(\ldots)$ is a floor function.

The term $E(@_{Di,j}/T_{BD})$ gives the order number of the block $BDC_i$ from which the datum $D_{i,j}$ may be loaded. Given that in this embodiment, the sizes $T_{BD}$ and $T_b$ are both powers of two, the division by the size $T_{BD}$ and the multiplication by the size $T_b$ may both be carried out by a shift register. A shift register shifts the bits of the number that it contains to the right to perform a division and to the left to perform a multiplication. More precisely, in this embodiment, the size $T_{BD}$ is equal to $2^6$ bytes and the size $T_b$ is equal to $2^7$ bytes. Here, the module 28 therefore comprises a hardware shift register. Under these conditions, the module 28 is capable of computing very rapidly, and typically in one clock cycle, the address $@_{BDCi}$.

Thus, here, to compute the address $@_{BDCi}$, the module 28 stores the address $@_{Di,j}$ in its shift register then shifts six bits to the right the bits of the address stored in this register to obtain the result of the ratio $@_{Di,j}/T_{BD}$. Next, the module 28 computes the integer part of the obtained ratio then stores this integer part in the shift register. Lastly, the shift register shifts seven bits to the left the bits of this integer part to obtain the address $@_{BDCi}$.

It is preferable for the computation of the address $@_{BDCi}$ to be very fast, because this computation is carried out each time a datum is accessed.

Once the address $@_{BDCi}$ has been determined, in a step 174, the module 28 verifies whether the address $@_{BDCi}$ is equal to an address $@_{BDCc}$. The address $@_{BDCc}$ is the address of the block $BDC_c$ from which the block $BD_c$ currently contained in the buffer 14 was obtained. The address $@_{BDCc}$ is, for example, stored in the memory 29.

If such is the case, this means that the block $BD_i$ that contains the datum $D_{i,j}$ to be accessed has already been stored in the buffer 14. In other words, the blocks $BD_i$ and $BD_c$ are the same. In this case, the method continues:
directly with a step 176 if the executed access instruction is a load instruction, or
directly with a step 190 if the executed access instruction is a write instruction.

In step 176, for the datum $D_{i,j}$ to be loaded, the module 28 notes the first identifier $IP_{i,j}$ contained in the metadata $MD_i$ of the block $BDC_i$ and associated with this datum $D_{i,j}$. Here, as explained below, this first identifier $IP_{i,j}$ is located in the register $B_{IP}$. The first identifier $IP_{i,j}$ is therefore extracted from this register $B_{IP}$. The module 28 also notes the second identifier $IP_{i,j}$ contained in the pointer $PD_{i,j}$ transmitted in step 170. To this end, the module 28 extracts the second identifier $IP_{i,j}$ from the range $P_2$ of the received pointer $PD_{i,j}$. Next, the module 28 verifies whether the first and second extracted identifiers $IP_{i,j}$ correspond. Here, the first and second identifiers $IP_{i,j}$ correspond only if they are equal.

If the first and second identifiers $IP_{i,j}$ correspond, in a step 178, processing of the datum $D_{i,j}$ by the microprocessor 2 is permitted. In this case, the datum $D_{i,j}$ is then loaded directly from the buffer 14 then, for example, transferred to one of the registers of the set 12. Next, the unit 10 executes instructions to process this datum $D_{i,j}$ stored in a register of the set 12.

If the first and second identifiers $IP_{i,j}$ do not correspond, i.e. they are different, in this case, the method continues with a step 180. In step 180, the module 28 triggers signalling of a fault in the execution of the binary code 30. In addition, here, in step 180, processing, by the microprocessor 2, of the datum $D_{i,j}$ is forbidden. For example, in step 180, the datum $D_{i,j}$ is not loaded into a register of the set 12.

Next, in a step 182, in response to this signalling of an execution fault, the microprocessor 2 implements one or more corrective measures and/or one or more countermeasures.

A wide range of countermeasures are possible. The countermeasures implemented may have very different degrees of severity. For example, the countermeasures implemented may range from simply displaying or simply storing in memory an error message without interrupting the normal execution of the binary code, right up to definitively disabling the microprocessor 2. The microprocessor 2 is considered to be disabled when it is definitively put into a state in which it is incapable of executing any binary code. Between these extreme degrees of severity, there are many other possible countermeasures, such as:
indicating via a human-machine interface detection of the faults, immediately interrupting the execution of the binary code and/or resetting it, and deleting the binary code from the memory MP and/or deleting the backup copy 40 and/or deleting the secret data.

In step 190, the value to be written to the datum $D_{i,j}$ is written directly to the datum $D_{i,j}$ of the block of data $BD_i$ currently stored in the buffer 14.

Next, in a step 192, the module 28 replaces, in the register $B_{IP}$, the preceding identifier $IP_{i,j}$ associated with the datum $D_{i,j}$ with the identifier $IP_{i,j}$ of the pointer $PD_{i,j}$ transmitted in step 170.

Here, when the datum $D_{i,j}$ is written to the buffer 14, the module 28 does not verify the identifier $IP_{i,j}$ associated with this datum. In contrast, each time a datum is written to the buffer 14, the module 28 permits use of the pointer $PD_{i,j}$ to subsequently load the datum $D_{i,j}$.

In addition, in step 192, the module 28 switches a dirty bit to its active state. Thus, the active state of this dirty bit indicates that the block $BD_c$ currently present in the buffer 14 has been written. In contrast, the inactive state of this dirty bit indicates that the block $BD_c$ currently stored in the buffer 14 has not been written.

If, in step 174, the address $@_{BDCi}$ is different from the address contained in the memory 29, this means that the block $BD_c$ currently contained in the buffer 14 does not contain the datum $D_{i,j}$ to be accessed. In this case, the method continues with a step 200.

In step 200, the module 28 verifies whether the block $BD_c$ currently contained in the buffer 14 has been written. Typically, to do this, the module 28 verifies the state of the dirty bit.

If the dirty bit is in its inactive state, it is not necessary to store the block $BD_c$ in the set 4. In this case, the method continues directly with a step 300 of transferring the block $BDC_i$ that contains the encrypted datum $D_{i,j}$ from the set 4 to the buffer 14.

In the contrary case, the block $BD_c$ currently stored in the buffer 14 must be saved to the set 4. In this case, the method continues with a step 400 of transferring the block $BD_c$ currently contained in the buffer 14 to the set 4.

The step 300 starts with an operation 302 of loading the block $BDC_i$ located at the address $@_{BDCi}$ determined in step 172. Typically, in the operation 302, the address $@_{BDCi}$ is automatically converted into a physical address by the memory management unit (MMU). Preferably, the block $BDC_i$ is loaded from the set 4 to the microprocessor over the bus 50 using a data block burst mode.

The loaded block $BDC_i$ is then temporarily stored in the microprocessor 2. For example, it is stored in the set 12 or in the memory 29 or in the buffer 14.

In the operation 304, the module 28 verifies the integrity of the loaded block $BDC_i$. Here, it verifies the integrity and authenticity of the cryptogram $BD_i$* and of the metadata $MD_i$ using the code $MAC_i$. To do this, the module 28 computes a code $MAC_i'$ using the same algorithm as that implemented to construct the code $MAC_i$ except that it uses the cryptogram $BD_i$* and the metadata $MD_i$ loaded in the operation 302. If the code $MAC_i'$ thus constructed is identical to the loaded code $MAC_i$, then the integrity and authenticity of the cryptogram $BD_i$* and of the metadata $MD_i$ are confirmed.

In this case, the module 28 permits the data $D_{i,j}$ to be processed by the microprocessor. To this end, here, the module 28 continues, in an operation 306, to decrypt the cryptogram $BD_i$* using, to do so, the key ka stored in its memory 29 and the vector $iv_i$ extracted from the metadata $MD_i$ of the loaded block $BDC_i$.

After the operation 306, in an operation 308, the obtained cleartext block $BD_i$ is stored in the buffer 14 in the place of the preceding block of data. On this occasion, the dirty bit is switched to its inactive state.

In the operation 308, the module 28 also stores the identifiers $IP_{i,j}$ contained in the metadata $MD_i$ of the block $BDC_i$ loaded into the register $B_{IP}$ of the memory 29. The vector $iv_i$ contained in the metadata $MD_i$ of the loaded block $BDC_i$ is also stored in the register $R_{iv}$ of the memory 29. Lastly, the address $@_{BDCi}$ of the loaded block $BDC_i$ is also stored in the memory 29. This stored address $@_{BDCi}$ becomes the new address $@_{BDCc}$.

In the case where the verification of the integrity of the block $BDC_i$ fails, the module 28 continues with an operation 310 of inhibiting processing of the data of this block. For example, here, in operation 310, the module 28 replaces the block $BD_c$ stored in the buffer 14 with a virgin block $BD_i$. In this operation 310, the module 28 initializes all the data of the virgin block $BD_i$ to a preset value. Typically, this preset value is the value zero. Next, this virgin block $BD_i$ is stored in the buffer 14 instead of the block $BD_c$. Also in this operation 310, the module 28 also sets to zero all the identifiers $IP_{i,j}$ contained in the register $B_{IP}$ of the memory 29. It also resets the value of the vector $iv_i$ contained in the register $R_{iv}$. For example, the new value of the vector $iv_i$ contained in the register $R_{iv}$ is generated via a random or pseudo-random draw. Lastly, the address $@_{BDCi}$ of the loaded block $BDC_i$ is also stored in the memory 29. Thus, in the case where the verification of the integrity of the block $BDC_i$ fails, it is a virgin block $BD_i$ that is stored in the buffer 14.

After the operation 308 or 310, the method continues with step 176 or step 190, depending on whether the instruction to be executed is a load instruction or a write instruction.

Step 400 starts with an operation 402 of conversion of the block $BD_c$ into a block $BDC_c$.

To achieve this conversion, in a sub-operation 404, the module 28 starts by generating a new vector $iv_i$. The new vector $iv_i$ is for example generated using the old value of this vector $iv_i$, which value is stored in the register $R_{iv}$. For example, the new vector $iv_i$ is obtained by incrementing this old value by a preset amount.

Next, in a sub-operation 406, the module 28 encrypts the block $BD_c$ currently contained in the buffer 14 using, to do so, the key ka and the new vector $iv_i$ generated in sub-operation 404. At the end of this operation, the cryptogram $BD_c$* is obtained.

In a sub-operation 408, the module 28 constructs the metadata $MD_c$. To do this, the module stores, in locations reserved to this end, the identifiers $IP_{i,j}$ currently contained in the register $B_{IP}$ and the vector $iv_i$ stored in the register $R_v$. Next, the module 28 computes the new code $MAC_c$, using the cryptogram $BD_c$* obtained at the end of sub-operation 406 and the constructed metadata $MD_c$.

Lastly, once the new code $MAC_c$ has been computed, at the end of sub-operation 408, the module 28 groups together, in the same block of data, the cryptogram $BD_c$*, the constructed metadata $MD_c$ and the new code $MAC_c$, in order to obtain a new block $BDC_c$.

Afterwards, in an operation 410, the new block $BDC_c$ is stored in the set 4 at the physical address corresponding to the address $@_{BDCc}$ currently contained in the memory 29.

Step 400 then ends and the method continues with step 300.

FIG. 7 shows a compiler 500 able to automatically generate the binary code 30 from a source code 502 of the computer program. To this end, the compiler 500 typically comprises a programmable microprocessor 504 and a memory 506. The memory 506 contains the instructions and data required to automatically generate, when they are executed by the microprocessor 504, the binary code 30 from the source code 502. For example, to do this, the compiler passes the source code 502 and generates, for each pointer $PD_{i,j}$ to be protected, the identifier $IP_{i,j}$ of this pointer. The identifier $IP_{i,j}$ thus generated is stored in the range $P_2$ of this pointer $IP_{i,j}$. Afterwards, the blocks $BDC_i$ that will then be stored in the portion 44 of the memory MP, after this binary code 30 has been loaded into this memory MP, are generated. More precisely, during the compilation, the compiler 500 converts each cleartext block $BD_i$ intended to be stored in the portion 44 of the memory MP into a block $BDC_i$ in a similar manner to the one that was described with reference to the method of FIG. 6. In particular, for each datum $D_{i,j}$ of the block $BD_i$ accessed using a pointer $PD_{i,j}$, the compiler automatically inserts the identifier $IP_{i,j}$ of this pointer in the location reserved to this end in the metadata $MD_i$. It is within the ability of a person skilled in the art to design and produce such a compiler, based on the explanations given in this description.

Section III: Variants

Variants of the Apparatus 1:

Other embodiments of the set 4 are possible. For example, the set 4 may comprise a higher number or a lower number of cache memories. In a greatly simplified case, the set 4 comprises no cache memory and, for example, comprises only the main memory MP.

The memory MP may be a non-volatile memory. In this case, it is not necessary to copy the binary code 30 to this memory before launching its execution since it is already stored therein.

Whether a memory of the set 4 is integrated or not into the microprocessor 2 may be freely modified. Thus, as a variant, the one or more cache memories L1, L2 and L3 are integrated into the microprocessor 2, i.e. produced on the same semiconductor chip as the unit 10 of the microprocessor 2. As a variant, the memory MP may also be an internal memory integrated into the microprocessor 2.

Many different hardware architectures may be used to produce the module 28. In particular, the module 28 may be made up of a combination of a plurality of hardware blocks of the microprocessor 2 that perform respective functions and that are each located in a different area of the chip of the microprocessor 2.

As a variant, the buffer 14 is able to simultaneously contain a plurality of blocks of cleartext data.

Variants of the Authentication Code:

Other methods for computing the authentication code are possible. For example, as a variant, the module 28 computes a first authentication code solely using the cryptogram $BD_i^*$ and a second authentication code solely using the metadata $MD_i$. In this case, the authentication code contained in the block $BDC_i$ is the result, for example, of the concatenation of these first and second authentication codes. Next, the first and second authentication codes are used, by the module 28, to verify the integrity of the cryptogram $BD_i^*$ and of the metadata $MD_i$, respectively, in the operation 304.

In another embodiment, the code $MAC_i$ is computed using the cryptogram $BD_i^*$ and without taking into account the metadata $MD_i$. In this case, preferably, the metadata $MD_i$ are then encrypted so that they do not appear in cleartext in the block $BDC_i$. For example, they are encrypted using the function $f_{ka}$.

In another variant, le code $MAC_i$ is computed using cleartext data $D_{i,j}$ and not using the cryptogram $BD_i^*$. In this case, it is necessary to invert the order of the operations of verifying the integrity of the authentication code and of decrypting the cryptogram $BD_i^*$. Specifically, in this case, the data must first be decrypted and only then is the module 28 able to verify the integrity thereof.

Variants of the Metadata:

As a variant, the metadata $MD_i$ comprise data other than the identifiers $IP_{i,j}$ and the vector $iv_i$. For example, the metadata may in addition comprise validity indicators such as those described in the United States patent application filed on Feb. 12, 2020 under Ser. No. 17/109,424. Conversely, in a simplified embodiment, the metadata $MD_i$ do not comprise the vector $iv_i$. In the latter case, the vector $iv_i$ to be used to decrypt the cryptogram $BD_i^*$ is then stored differently. For example, a register associating, with each block $BDC_i$, the vector $iv_i$ required to decrypt the cryptogram $BD_i^*$ is stored in the memory MP.

The metadata may be stored in the buffer 14 or in a register independent of the buffer 14 and of the memory 29. In the case where the metadata $MD_i$ are stored in the buffer 14, said metadata are, preferably, stored in an address range that is distinct from the address range in which the data $D_{i,j}$ are stored. Typically, this distinct address range is not addressable by the unit 10, so that the presence of the metadata $MD_i$ in the buffer 14 in no way modifies the way in which the data $D_{i,j}$ are addressed. In contrast, the metadata $MD_i$ are accessible by the module 28, so that it can carry out the various steps described in Section II.

As a variant, when the new vector $iv_i$ of a block $BDC_i$ is generated without taking into account its preceding value, it is not necessary to save its preceding value to the register $R_{iv}$ after the block $BDC_i$ has been loaded into the buffer 14. This is for example the case when, on each transfer of a block of data from the buffer 14 to the set 4, the new vector $iv_i$ is generated via a random or pseudo-random draw.

Other methods for generating a new vector $iv_i$ are possible. For example, the new vector $iv_i$ is set equal to the preceding value of the code $MAC_i$. In this case, each time a block $BDC_i$ is transferred from the set 4 to the buffer 14, the code $MAC_i$ contained in this block $BDC_i$ is stored in the microprocessor, for example, in the memory 29.

The new vector $iv_i$ may also be completed with other information to obtain a complete initialization vector $ivc_i$ then, in the encrypting operation 406, it is this vector $ivc_i$ that is used instead of the vector $iv_i$. In this case, the cryptogram $BD_i^*$ is the result of the function $f_{ka}(BD_i, ivc_i)$. The decrypting operation 306 must then be modified accordingly. In other words, the cleartext block $BD_i$ is the result of the function $f_{ka}^{-1}(BD_i^*; ivc_i)$. For example, the vector $ivc_i$ is obtained by combining the vector $iv_i$ and the address $@_{BDCi}$ contained in the memory 29. For example, the vector $iv_i$ and the address $@_{BDCi}$ are concatenated. The vector $ivc_i$ may also be obtained by combining the vector $iv_i$ with an identifier of the binary code 30. In this case, the obtained cryptogram $BD_i^*$ is dependent on the binary code 30 to be executed. The vector $ivc_i$ may also be obtained by combining the vector $iv_i$, the address $@_{BDCi}$ and the identifier of the binary code 30.

Variants of the Method:

Other embodiments of step 176 are possible. For example, in step 176, two pointer identifiers are said to correspond if the difference between these two identifiers is lower, in absolute value, than a predetermined threshold.

Step 176 may also be executed before step 304 of verifying the integrity of the block of data loaded. In this case, for example, steps 304, 306, 308 and 310 are executed between steps 176 and 178.

The encryption function $f_{ka}$ may be a block cipher. In this case, the cryptogram $BD_i^*$ may only be decrypted in its entirety to obtain the cleartext block $BD_i$, and not datum by datum. The encryption function $f_{ka}$ may also be a symmetric encryption function that encrypts the data $D_{i,j}$ of the block $BD_i$ one after the other in a predetermined order, for example, in increasing order of the indices j. In this case, the cryptogram $BD_i^*$ must also be decrypted in the same predetermined order. Thus, in this case, from the cryptogram $BD_i^*$, the function $f_{ka}^{-1}$ only allows the cleartext data $D_{i,j}$ to be obtained, one after the other, in increasing order of the indices j. For example, to this end, the encryption function $f_{ka}$ is a stream cipher. This stream cipher $f_{ka}$ is then initialized with the vector $iv_i$ at the start of the encryption of each block $BD_i$.

In the case where the function $f_{ka}^{-1}$ allows the data $D_{i,j}$ to be obtained one after the other, in one advantageous embodiment, the metadata $MD_i$ and, in particular, the vector $iv_i$ are located at the start of the block $BDC_i$ of encrypted data so that the vector $iv_i$ is loaded into the microprocessor first. In this case, the module 28 may start to decrypt the cryptogram $BD_i^*$ while it is being received rather than waiting until this cryptogram $BD_i^*$ has been completely loaded into the microprocessor. This is advantageous when the size of the cryptogram $BD_i^*$ is larger than the size of the databus used to transfer data to the microprocessor. Specifically, in such a situation, the cryptogram $BD_i^*$ is transferred to the microprocessor in successive chunks. It is therefore necessary to execute, one after the other, a plurality of transfer operations between the set 4 of encrypted memories and the microprocessor to transfer the complete cryptogram $BD_i^*$. When the vector $iv_i$ is received first, decryption of the first received chunk of the cryptogram $BD_i^*$ may start before the following chunk of the cryptogram $BD_i^*$ is received. Thus, execution of the function $f_{ka}^{-1}$ makes it possible to obtain first the datum $D_{i,1}$, then the datum $D_{i,2}$ and so on up to the datum $D_{i,Nd}$. In this embodiment, the loading operation 302 and the decrypting operation 306 are, partially, carried out in parallel. In this variant, the code $MAC_i$ is constructed using the cleartext block $BD_i$ and not using the cryptogram $BD_i^*$. The operation 304 of verifying the code $MAC_i$ is then executed once the complete cryptogram $BDC_i$ has been received and decrypted. It is also possible to temporarily store each received chunk of the cryptogram $BDC_i$ in the microprocessor then to execute the operation 304 as described above, i.e. on the complete cryptogram $BD_i^*$ and not on the block $BD_i$ of cleartext data. Advantageously, in this embodiment, to save even more time, a datum $D_{i,j}$ that has just been decrypted may be used and processed by the microprocessor before the code $MAC_i$ has been verified and therefore before the operation 304 has ended. Thus, in this embodiment, steps 176 and 190 may be executed before the operation 304 has ended. If, subsequently, the verification of the integrity of the block $BDC_i$ fails, then the operation 310 is immediately triggered to inhibit any subsequent use of the data of this block $BD_i$. If subsequently, in contrast, the verification of the integrity of the block $BDC_i$ succeeds, then continued use of the data of the block $BD_i$ is permitted.

When the verification of the integrity of the code $MAC_i$ fails, one or more of the countermeasures described above may be triggered and executed.

As a variant, a relationship other than relationship (1) is used to determine the address $@_{BDCi}$ at which the block $BDC_i$ is stored. In this case, relationship (2) must be modified accordingly. For example, in one particularly flexible embodiment, the module 28 comprises a lookup table that, with each address $@_{BDi}$ of a cleartext block $BD_i$, associates the address $@_{BDCi}$ of the block $BDC_i$ containing the data $D_{i,j}$ in encrypted form. In such a case, the module 28 is able to determine the address $@B_{BDCi}$ of the block containing the datum $D_{i,j}$ located at the address $@_{Di,j}$ by implementing the following steps:

Step 1: the module 28 computes the address $@_{BDi}$ of the block $BD_i$ that contains the datum $D_{i,j}$ using the following relationship: $@_{BDi}=E(@_{Di,j}/T_{BD})\cdot T_{BD}$, then Step 2: the module 28 looks, in the lookup table, for the address $@_{BDCi}$ associated with the computed address $@_{BDi}$.

Because the sizes $T_b$ and $T_{BD}$ are both powers of two, the size $T_b$ is two times larger than the size $T_{BD}$. Thus, each time the size $T_{BD}$ is increased, the size $T_b$ must also be increased proportionally. This therefore amounts to increasing the space available to store the metadata $MD_i$ and the code $MAC_i$. However, it is not always desirable to increase the space available to store the metadata $MD_i$ and the code $MAC_i$ because this causes more memory space to be occupied, without necessarily improving the performance of the apparatus 1. Thus, as a variant, the size $T_b$ is not equal to two times the size $T_{BD}$. For example, the size $T_b$ is smaller than $2T_{BD}$. In the latter case, preferably, the sizes $T_b$ and $T_{BD}$ are then chosen so that the number $(T_b-T_{BD})$ and the size $T_{BD}$ are both powers of two. In this case, relationship (1) is replaced by the following relationship, relationship (3): $@_{BDCi}=@_{BDi}+@_{BDi}(T_b-T_{BD})/T_{BD}$. Relationship (2) is replaced by the following relationship, relationship (4): $@_{BDCi}=E(@_{Di,j}/T_{BD})\cdot T_{BD}+E(@_{Di,j}/T_{BD})(T_b-T_{BD})$. In relationships (3) and (4), the multiplications and divisions may still be carried out using the shift registers of the module 28 and therefore very rapidly. In contrast, with respect to the case where relationships (1) and (2) are used, it is necessary to perform one extra addition operation to compute the address $@_{BDCi}$. Therefore, this variant is a little slower than the one described in Section II. In contrast, it has the advantage of permitting a size $T_{BD}$ that is larger than the size $(T_b-T_{BD})$, i.e. larger than the size of the metadata $MD_i$ and of the code $MAC_i$.

What was described in detail in the particular case of the portion 44 of the memory MP, applies to any other portion of the memory MP containing data to be protected. For example, this teaching may also be applied to the stack 46 or to the heap 48. In the case of the heap 48, as already indicated above, the identifier $IP_{i,j}$ is generated at the same time as the pointer $PD_{i,j}$, i.e. not during compilation but during execution of the binary code 30. Next, the identifier $IP_{i,j}$ is stored in the register $B_{IP}$, preferably, each time a datum $D_{i,j}$ is written, using this pointer $PD_{i,j}$, to the dynamically allocated memory region.

In the detailed exemplary embodiment, the transfer in entire blocks between the set 4 and the microprocessor 2 is solely implemented for the data and not for the instructions of the machine code 30. In this case, the instructions are stored in the set 4 in a conventional way. Thus, in this embodiment, the instructions are transferred one by one to the microprocessor 2. In addition, in this case, the instructions are not necessarily stored in encrypted form in the set 4. However, everything that has been described here in the particular case of the data may also be applied to the instructions of the machine code 32. Below, when a block contains instructions, it is called an "instruction block". For example, as described in the particular case of the data, the machine code is divided into successive and contiguous instruction blocks. For example, in a first embodiment, the structures of the block of data and of the instruction blocks are identical. In addition, the manner of proceeding is identical both in the case of the blocks of data and in the case of the instruction blocks. A person skilled in the art will be able to transpose, without difficulty, on the basis thereof, the teaching given here in the particular case of the blocks of data to the case of the instructions. It is therefore merely underlined that, in the case of instructions, the address of the next instruction to be loaded into the microprocessor 2 is contained in the instruction pointer 26 and not in a load instruction executed by the unit 10. It is also underlined that, preferably, the buffer used to store a cleartext instruction block is a buffer, for example one structurally identical to the buffer 14, but distinct from the buffer 14 and dedicated to storage of an instruction block. Lastly, it will be noted that in the case of instructions, instruction pointers are often used to call functions and they are therefore also referred to as "function pointers". The advantage of processing instructions and data in exactly the same way is also the resulting harmonization of the processing operations and, therefore, simplification of the security module 28.

Other Variants:

The various embodiments and the various variants have, up to now, been described in the particular case in which the unencrypted memory is the buffer 14 and the encrypted memory is the memory set 4, i.e. the memory of just higher rank. However, the teaching given here applies to any unencrypted and encrypted memories between which data are transferred in entire blocks of encrypted and authenticated data. For example, as a variant, the unencrypted memory is the cache memory L1 and the encrypted memory is the cache memory L2. In this case, the security module is, for example, implemented in the cache memory L1 to encrypt and decrypt the blocks $BDC_i$ that are transferred between these two cache memories L1 and L2. It will be noted that, in this case, the data are in cleartext in the cache memory L1 and are encrypted in the cache memory L2. Provided that the data are encrypted in the cache memory L2, they will necessarily be encrypted in the memories of higher rank. What is described here may also be applied between the cache memories L2 and L3 or between the cache memory L3 and the main memory MP.

In the case where the security module is solely implemented between two memory levels higher than the buffer 14, the buffer 14 may be removed.

The embodiments described here may also be implemented in an apparatus devoid of virtual-memory mechanism. In this case, the bijective function that relates the virtual addresses to the corresponding physical addresses is the identity function. The MMU is then omitted.

Section IV: Advantages of the Described Embodiments

Step 176 of verifying the correspondence between the first and second identifiers $IP_{i,j}$ allows practically all erroneous uses of a pointer to be detected. For example, step 176 detects incorrect use of a pointer $PD_k$ to read the datum $D_{i,j}$. More precisely, if another pointer $PD_k$ different from the expected pointer $PD_{i,j}$ is used to read the datum $D_{i,j}$, it is the identifier $IP_k$ that is compared to the identifier $IP_{i,j}$ extracted from the metadata $MD_i$. Therefore, this erroneous use of the pointer $PD_k$ is detected and therefore triggers the signalling of an execution fault. If the pointer $PD_k$ is used to write a datum $D_k$ instead of the datum $D_{i,j}$, then the identifier $IP_k$ of the pointer $PD_k$ is stored instead of the identifier $IP_{i,j}$. Subsequently, if the pointer $PD_{i,j}$ is used to read the datum $D_k$, the identifier $IP_{i,j}$ contained in the pointer $PD_{i,j}$ is different from the identifier $IP_k$ contained in the metadata $MD_i$. Thus, this erroneous use of the pointer $PD_k$ is also detected. By virtue thereof, stack overflow attacks are detected.

Likewise, step 176 allows use of the pointer $PD_{i,j}$ after the memory region containing the datum $D_{i,j}$ has been freed to be detected. Specifically, typically, after this memory region is freed, it is reused to store other data. To reuse this memory region, a new pointer $PD_k$ is generated then used to store data in this memory region. This new pointer $PD_k$ contains an identifier $IP_k$ different from the identifier $IP_{i,j}$. Hence, if the pointer $PD_{i,j}$ is used to read one of the data written using the pointer $PD_k$, this is detected. Specifically, in this case as well, the pointer identifiers contained on the one hand in the pointer $PD_{i,j}$ and on the other hand in the metadata $MD_k$, do not correspond. Thus, step 176 allows attacks using dangling pointers or use-after-free attacks to be detected.

Computing the code $MAC_i$ contained in the block $BDC_i$ using identifiers $IP_{i,j}$ makes falsification of the values of these identifiers very difficult. This therefore increases the security of the executing method.

The fact of storing the vector $iv_i$ in the metadata $MD_i$ allows each vector $iv_i$ required to decrypt the cryptogram $BD_i^*$ to simply be stored then found.

The fact that the module 28 executes the various operations related to encryption, decryption and verification of the data itself makes the method for increasing the security of the data transparent to the unit 10. In practice, the unit 10 operates as though all the data were in cleartext without having to preoccupy itself with encryption and decryption or with the presence of metadata $MD_i$ in the encrypted memory.

Using a stream cipher and storing, in the block $BDC_i$, the vector $iv_i$ before the cryptogram $BD_i^*$, allows decryption of the datum $BD_{i,1}$ to be started before the microprocessor has received the complete cryptogram $BD_i^*$. This therefore allows the execution of the method to be accelerated.

The fact that the module 28 itself computes the address $@_{BCCi}$ of the block $BDC_i$ from which may be loaded a datum $D_{i,j}$ to be accessed makes the presence of the metadata $MD_i$ and of the code $MAC_i$ transparent to the unit 10. Specifically, it is the module 28 that carries out the address conversion and not the unit 10.

The invention claimed is:

1. A method for executing a computer program with an electronic apparatus comprising a microprocessor, an unencrypted memory, an encrypted memory, and a hardware security module, wherein, during the execution of the computer program, lines of code are transferred between the unencrypted memory and the encrypted memory in whole blocks of a plurality of encrypted and authenticated lines of code, said method comprising:

storing, in the encrypted memory, a block of the encrypted and authenticated lines of code, which contain a line of code to be accessed using a pointer, said block of the encrypted and authenticated lines of code containing: a cryptogram of all of the lines of code of said block, said cryptogram having to be decrypted in its entirety to obtain a block of cleartext lines of code, an authentication code computed from the block of cleartext lines of codes or from the cryptogram of the block of cleartext lines of code, and metadata, obtaining, with the microprocessor, the pointer, which contains an address at which the line of code to be accessed is stored, loading the block containing the line of code to be accessed from the encrypted memory into the microprocessor, decrypting the cryptogram contained in the loaded block to obtain the block of cleartext lines of code, and storing the obtained block of cleartext lines of code in the unencrypted memory and storing the metadata of the loaded block, verifying, with the hardware security module and using the authentication code contained in the loaded block, an integrity of the block of cleartext lines of code obtained from the cryptogram contained in the loaded block, or of the cryptogram contained in the loaded block, and when said verification fails, inhibiting processing, by the microprocessor, of the lines of code of said loaded block and, when said verification succeeds, permitting processing, by the microprocessor, of the lines of code of said loaded block, wherein:

the storing step comprises incorporating, into the metadata of the block containing the line of code to be accessed, a first pointer identifier associated with the line of code to be accessed, said first pointer identifier alone allowing one pointer to be uniquely identified among a set containing a plurality of different pointers employed in a same execution of the computer program by the microprocessor, the obtaining step comprises obtaining the pointer, which includes a first range of bits containing the address of the line of code to be accessed, and a different second range of bits containing a second pointer identifier, and the method further comprises verifying, with the hardware security module, that the second pointer identifier contained in the obtained pointer corresponds to the first pointer identifier associated with the line of code to be accessed and contained in the metadata of the loaded block, and when the first and second pointer identifiers do not correspond, the security module triggers signalling of an execution fault and, in a contrary case, the security module inhibits triggering of signalling of an execution fault and the microprocessor processes the line of code to be accessed.

2. The method according to claim 1, wherein the decrypting step comprises storing the first pointer identifier contained in the metadata of the loaded block in a memory solely accessible by the hardware security module.

3. The method according to claim 1, wherein, before the storing step, the authentication code of the block of encrypted and authenticated lines of code to be stored is also computed from the metadata.

4. The method according to claim 1, wherein, before the storing step, the method further comprises:

encrypting the block of cleartext lines of code using an initialization vector and generating a new initialization vector before each encryption of the block of cleartext lines of code, incorporating, into the metadata of the block of the encrypted and authenticated lines of code, the initialization vector used to obtain the cryptogram of said block of the encrypted and authenticated lines of code, and during the decryption of the cryptogram, the hardware security module extracts, from the metadata of the block of the encrypted and authenticated lines of code, the initialization vector to be used to perform the decryption.

5. The method according to claim 4, wherein:

during the encryption of the block of cleartext lines of code, the cleartext lines of code are encrypted using a stream cipher initialized using the initialization vector, the initialization vector is stored in the block of the encrypted and authenticated lines of code before the cryptogram of all of the lines of code of said block, and during the decryption of the cryptogram, the hardware security module first extracts the initialization vector to be used to perform the decryption and then immediately starts decrypting the first line of code of the cryptogram, said line of code being received before the complete cryptogram is received.

6. The method according to claim 1, wherein, in the storing step, a block address at which the block of the encrypted and authenticated lines of code is stored is related, by a bijective function, to an address $@_{BDCi}$ defined by the following relationship: $@_{BDCi}=@_{BDi}\cdot T_b/T_{BD}$, where:

$@_{BDi}$ is an address at which starts, in an address space of the computer program, the block of cleartext lines of code, $T_b$ is a size, in number of bytes, of the block of the encrypted and authenticated lines of code, and $T_{BD}$ is a size, in number of bytes, of the block of cleartext lines of code.

7. The method according to claim 6, wherein:

after the obtaining step and before the loading step, the hardware security module determines the address $@_{BDCi}$ using the following first relationship: $@_{BDCi}=E(@_{Di,j}/T_{BD})\cdot T_b$, where E( ) is a function that returns an integer part of a number located between the parentheses, $@_{Di,j}$ is the address contained in the pointer obtained in the obtaining step, and $T_b$ and $T_{BD}$ are both powers of two, a division and multiplication of the first relationship being executed by shift registers of the hardware security module during said determining operation, and in the loading step, the block containing the line of code to be accessed is loaded, from the encrypted memory, from the block address related, by the bijective function, to the determined address $@_{BDCi}$.

8. The method according to claim 6, wherein:

after the obtaining step and before the loading step, the hardware security module determines the address $@_{BDCi}$ using the following second relationship: $@_{BDCi}=E(@_{Di,j}/T_{BD})\cdot T_{BD}+E(@_{Di,j}/T_{BD})\cdot(T_b-T_{BD})$, where E( ) is a function that returns an integer part of a number located between the parentheses, $@_{Di,j}$ is the address contained in the pointer obtained in the obtaining step, and $(T_b-T_{BD})$ and $T_{BD}$ are both powers of two, each division and each multiplication of the second relationship are executed by shift registers of the hardware security module during said determining operation, and in the loading step, the block containing the line of code to be accessed is loaded, from the encrypted memory, from the block address related, by the bijective function, to the determined address $@_{BDCi}$.

9. The method according to claim 1, wherein the cryptogram of all of the lines of code of the stored block of encrypted and authenticated lines of code:

may solely be decrypted in its entirety to obtain the block of cleartext line of code, and not line of code by line of code, or may solely be decrypted in a predetermined order to obtain the block of cleartext line of code, and does not permit the lines of code to be decrypted in any order.

10. A non-transitory computer-readable medium storing a computer program configured to be executed by the microprocessor by implementing a method according to claim 1, wherein binary code of the computer program comprises:

the block of the encrypted and authenticated lines of code containing the line of code to be accessed using the pointer, said block of the encrypted and authenticated lines of code containing: the cryptogram of all of the lines of code of said block, said cryptogram having to be decrypted in its entirety to obtain a block of cleartext lines of code, the authentication code computed from the block of cleartext lines of codes or from the cryptogram of the block of cleartext lines of code, and the metadata, and the pointer containing the address at which the line of code to be accessed is stored, wherein:

the metadata comprise the first pointer identifier associated with the line of code to be accessed, said first pointer identifier alone allowing one pointer to be uniquely identified among the set containing a plurality of different pointers employed in the same execution of the computer program by the microprocessor, and the pointer comprises the first range of bits containing the address of the line of code to be accessed, and the different second range of bits containing a second pointer identifier, said second pointer identifier being equal to the first pointer identifier.

11. A hardware security module for implementing a method according to claim 1, wherein the hardware security module is configured to:

trigger storage, in the encrypted memory, of the block of the encrypted and authenticated lines of code containing the line of code to be accessed using the pointer, said block of the encrypted and authenticated lines of code containing: the cryptogram of all of the lines of code of said block, said cryptogram having to be decrypted in its entirety to obtain the block of cleartext lines of code, the authentication code computed from the block of cleartext lines of codes or from the cryptogram of the block of cleartext lines of code, and the metadata, receive the pointer containing the address at which the line of code to be accessed is stored, trigger loading of the block containing the line of code to be accessed from the encrypted memory into the microprocessor, decrypt the cryptogram contained in the loaded block to obtain the block of cleartext lines of code, and trigger storage of the obtained block of cleartext lines of code in the unencrypted memory and storing the metadata of the loaded block, verify, using the authentication code contained in the loaded block, the integrity of the block of cleartext lines of code obtained from the cryptogram contained in the loaded block, or of the cryptogram contained in the loaded block, and when said verification fails, inhibiting processing, by the microprocessor, of the lines of code of said loaded block and, when said verification succeeds, permitting processing, by the microprocessor, of the lines of code of said loaded block, wherein the security module is further configured to:

incorporate, into the metadata of the block containing the line of code to be accessed, the first pointer identifier associated with the line of code to be accessed, said first pointer identifier alone allowing one pointer to be uniquely identified among the set containing the plurality of different pointers employed in the same execution of the computer program by the microprocessor, in response to execution of an instruction to access the line of code to be accessed using the pointer, extract the second pointer identifier from the range of bits of said pointer, and verify that the second pointer identifier corresponds to the first pointer identifier associated with the line of code to be accessed and contained in the metadata of the loaded block, and when the first and second pointer identifiers do not correspond, trigger signalling of the execution fault and, in the contrary case, inhibit triggering of the signalling of the execution fault and permit the microprocessor to process the line of code to be accessed.

* * * * *